US009026181B2

(12) United States Patent
Tani et al.

(10) Patent No.: US 9,026,181 B2
(45) Date of Patent: May 5, 2015

(54) PORTABLE TERMINAL DEVICE

(75) Inventors: Minako Tani, Higashiosaka (JP);
Takeru Yoshihara, Neyagawa (JP);
Tomona Asai, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/878,880

(22) PCT Filed: Oct. 5, 2011

(86) PCT No.: PCT/JP2011/072969
§ 371 (c)(1),
(2), (4) Date: Apr. 11, 2013

(87) PCT Pub. No.: WO2012/050026
PCT Pub. Date: Apr. 19, 2012

(65) Prior Publication Data
US 2013/0196718 A1    Aug. 1, 2013

(30) Foreign Application Priority Data

Oct. 12, 2010   (JP) .................................. 2010-229684

(51) Int. Cl.
*H04M 1/00*       (2006.01)
*H04B 1/38*       (2006.01)
(Continued)

(52) U.S. Cl.
CPC .............. *G06F 1/1613* (2013.01); *G01C 21/20* (2013.01); *G01C 21/3632* (2013.01);
(Continued)

(58) Field of Classification Search
CPC .......... H04M 1/72519; H04M 1/0233; H04M 1/0266; H04M 1/0268; H04M 1/0295; H04M 3/48; H04W 64/00; H04W 4/02
USPC ....................................... 455/566, 456.1–460
See application file for complete search history.

(56) References Cited

U.S. PATENT DOCUMENTS 8,095,152 B2 *   1/2012   Sheha et al. ................ 455/456.1
8,326,327 B2 *  12/2012   Hymel et al. ............... 455/456.3
(Continued)

FOREIGN PATENT DOCUMENTS

JP    2005-227208 A    8/2005
JP    2006-153630 A    6/2006
(Continued)

OTHER PUBLICATIONS

International Search Report dated Dec. 20, 2011, issued for International Application No. PCT/JP2011/072969.
(Continued)

*Primary Examiner* — Edward Urban
*Assistant Examiner* — Rui Hu
(74) *Attorney, Agent, or Firm* — Procopio, Cory, Hargreaves & Savitch, LLP

(57) ABSTRACT

A portable terminal device includes a display module which can be set to be in a see-through state that a user can see-through a scenery behind, a display control module which controls the display module, a storage module which stores a destination position, a position obtaining module which obtains a current position, and a comparison module which compares the destination position and the current position. Then, the display control module displays information showing the destination position on the display module according to a comparison result of the comparison module, and sets a display area other than information showing the destination position on the display module to be in the see-through state.

6 Claims, 15 Drawing Sheets

(51) Int. Cl.
   *G06F 1/16*    (2006.01)
   *G01C 21/20*   (2006.01)
   *G01C 21/36*   (2006.01)
   *H04M 1/02*    (2006.01)
   *H04M 1/725*   (2006.01)
   *G09B 29/10*   (2006.01)

(52) U.S. Cl.
   CPC ........ *G01C 21/3664* (2013.01); *H04M 1/0237* (2013.01); *H04M 2250/12* (2013.01); *H04M 1/72572* (2013.01); *H04M 2250/16* (2013.01); *G09B 29/106* (2013.01); *G06F 1/1624* (2013.01); *G06F 1/1647* (2013.01); *G06F 1/1677* (2013.01); *G06F 2200/1637* (2013.01)

(56) References Cited

U.S. PATENT DOCUMENTS

| | | | |
|---|---|---|---|
| 2007/0242131 A1* | 10/2007 | Sanz-Pastor et al. | 348/14.02 |
| 2008/0186210 A1* | 8/2008 | Tseng | 340/995.26 |
| 2009/0298546 A1* | 12/2009 | Kim et al. | 455/566 |
| 2010/0029293 A1* | 2/2010 | Bergh et al. | 455/456.1 |
| 2010/0070162 A1 | 3/2010 | Aihara | |
| 2010/0203904 A1* | 8/2010 | Khokhlov | 455/457 |
| 2010/0222110 A1* | 9/2010 | Kim et al. | 455/566 |
| 2011/0084893 A1* | 4/2011 | Lee et al. | 345/6 |
| 2011/0209201 A1* | 8/2011 | Chollat | 726/4 |
| 2012/0052880 A1* | 3/2012 | Hymel et al. | 455/456.3 |
| 2012/0081272 A1* | 4/2012 | Ogita et al. | 345/4 |
| 2012/0202530 A1* | 8/2012 | Sheha et al. | 455/457 |
| 2012/0274593 A1* | 11/2012 | Chiang | 345/173 |

FOREIGN PATENT DOCUMENTS

| | | |
|---|---|---|
| JP | 2010-145385 A | 7/2010 |
| WO | 2008/044309 A1 | 4/2008 |

OTHER PUBLICATIONS

International Preliminary Report on Patentability issued for International Application No. PCT/JP2011/072969.

* cited by examiner

| LATITUDE | LONGITUDE | DATE AND TIME | COMMENTS |
|---|---|---|---|
| 34 degrees 42 minutes | 135 degrees 30 minutes | 5/21/2010 | FOOD AT RESTAURANT E IS EXCELLENT. |
| 35 degrees 63 minutes | 139 degrees 88 minutes | 8/2/2010 | FIREWORKS FROM HERE WERE BEAUTIFUL. |
| ... | ... | ... | ... |
| 35 degrees 27 minutes | 136 degrees 3 minutes | 10/4/2010 | THE VIEW WAS MAGNIFICENT. |

FIG. 5

PORTABLE TERMINAL DEVICE

TECHNICAL FIELD

The present invention relates to a portable terminal device such as a cellular phone, a PDA (Personal Digital Assistant) and so forth.

BACKGROUND ART

Conventionally, a portable terminal device having a navigation function displaying a route from a current position to a destination position on a map is well known. With this kind of portable terminal devices, while a map with a route from a current position to a landmark is shown, a direction a user is facing is also shown on the map. (For example, Patent Document 1)

SUMMARY OF INVENTION

Technical Problem

However, in the above conventional construction, the map is shown in two dimensions, and a disposition of roads and buildings seen from overhead of a user is shown on the map. On the other hand, the user often sees a direction horizontal to the ground. In this case, if the directions the user is looking at and the map is displaying are different, the user needs to figure out relative relationships of these two by comparing a scenery the user is looking at and the display of the map. For this reason, the user needs to figure out his/her location and direction, it is difficult to determine the direction the route is showing at once.

The present invention is done in light of the above technical problem, therefore the objection is to provide a portable terminal device which can display a route to a destination position simply and clearly.

Solution to Problem

The portable terminal device related to a main aspect of the present invention includes a display module which can be set to be in a see-through state that a user can see through a scenery behind, a display control module which controls the display module, a storage module which stores a destination position, a position obtaining module which obtains a current position, a comparison module which compares the destination position and the current position. Here, the display control module displays information showing the destination position on the display module according to a comparison result of the comparison module, and sets a display area other than the information showing the destination position in the display module to be in the see-through state.

Advantageous Effects of Invention

As the above, according to the portable terminal device of the present invention, it is possible to display the route to the destination position simply and clearly.

An advantage or significance of the present invention will become clearer from the description of embodiment, as shown below. However, the following description of embodiment is simply one illustration in embodying the present invention, and the present invention is not limited by what is described in the following description of embodiment.

BRIEF DESCRIPTION OF DRAWINGS

FIG. 5 is a point information database according to the embodiment.

Figure 1:
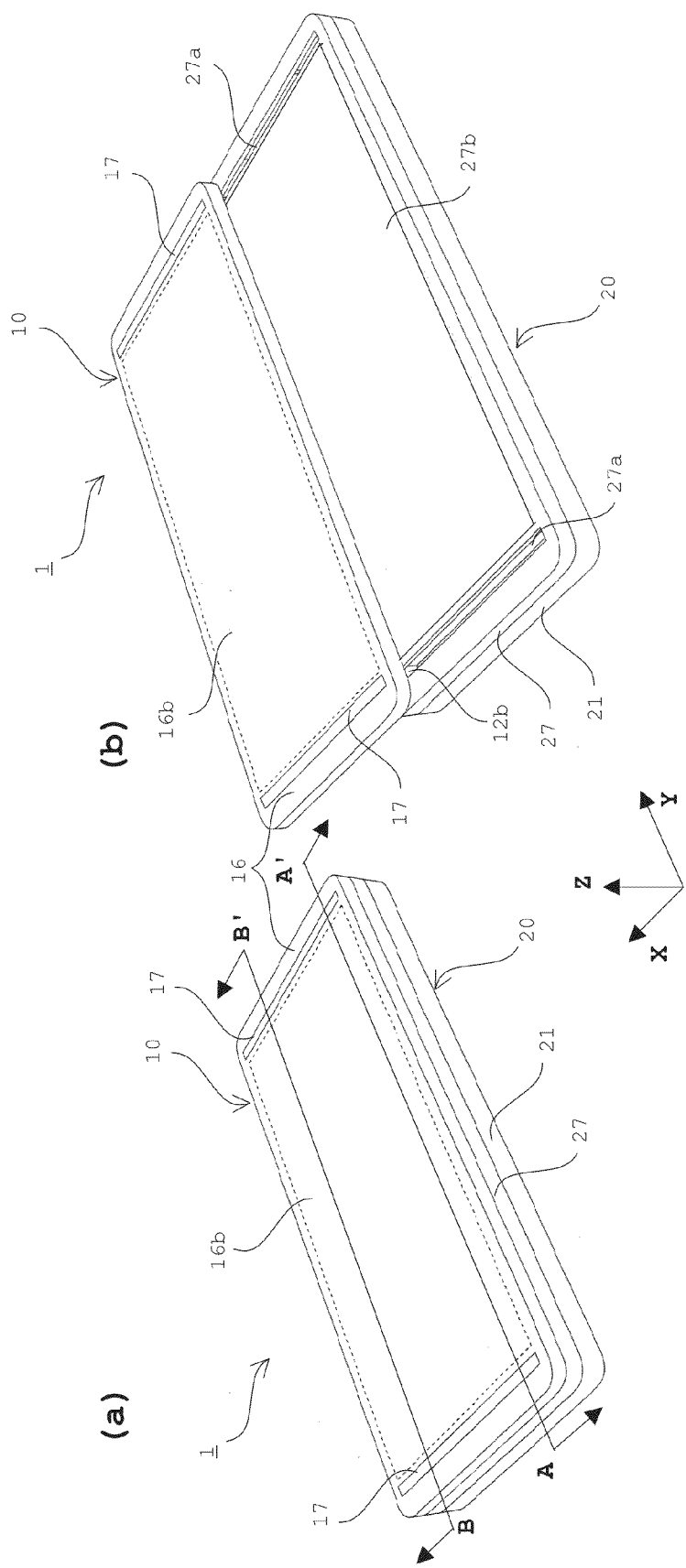
FIGS. 1(a) and 1(b) are diagrams showing perspective overviews of a portable terminal device according to an embodiment.

The drawings are entirely used for an explanation for an example of the embodiment, however, and not intended to limit a scope of the present invention.

DESCRIPTION OF EMBODIMENTS

In the following, a portable terminal device 1 according to the embodiments of the present invention will be described with reference to the drawings.

It is noted that, in the present embodiment, an acceleration sensor 106 corresponds to a "tilt detecting module" recited in the scope of the claims. A first input module 14 and a second input module 24 correspond to "designation detecting modules" recited in the scope of the claims. A memory 101 corresponds to a "storage module" recited in the scope of the claims. A "display control module," "position obtaining module," "comparison module," "direction obtaining module," "determination module" and "registration module" recited in the scope of the claims are realized as functions to be given to a CPU 100 by a controlling program stored in the memory 101. It is noted that the description geared the above scope of the claims and the present embodiment is just one example, and it does not limit the scope of the claims to the present embodiment.

<Construction of Portable Terminal Device 1>

Figure 2:
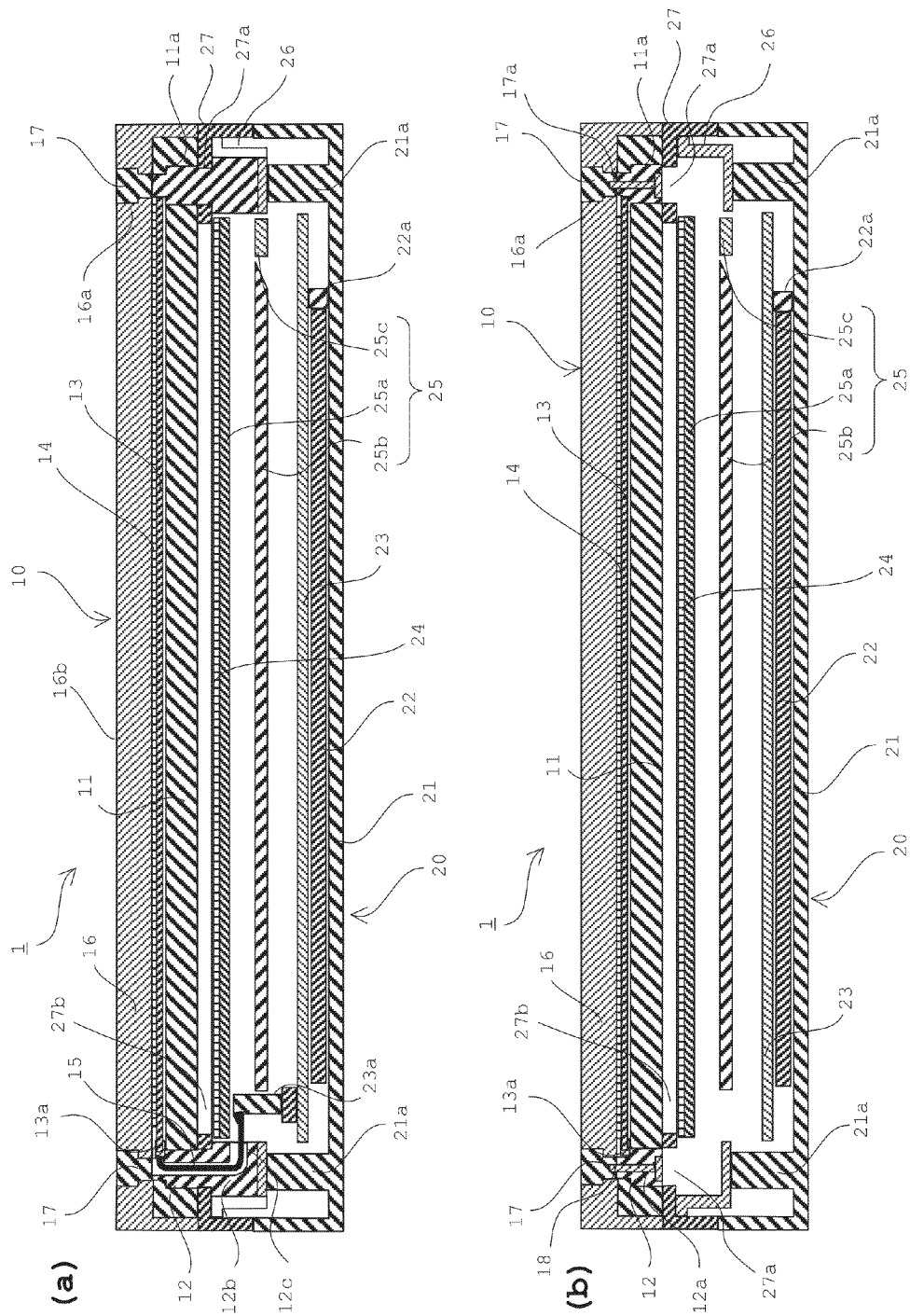
FIGS. 2(a) and 2(b) are diagrams showing cross-section views of the portable terminal device according to the embodiment.

FIG. 1(a) is a perspective view of a portable terminal device 1 showing a state that a first unit 10 is overlapped on a second unit 20. FIG. 1(b) is a perspective view of the portable terminal device 1 showing the state the first unit 10 and the second unit 20 are arranged side by side. FIG. 2(a) is a cross-section view of FIG. 1(a) along the line A-A'. FIG. 2(b) is a cross-section view of FIG. 1(a) along the line B-B'.

The portable terminal device 1 is a portable computer having Near Field Communication functions, such as a mobile phone, PDA, portable game machine, etc. The portable terminal device 1 provides the first unit 10 and the second unit 20.

The first unit 10 is overlapped on the second unit 20, and the first unit 10 is slidable against the second unit 20. The first unit 10 provides a first bottom part 11.

The first bottom part 11 has a rectangle shape, is made from transparent resin, such as polycarbonate, acrylic, etc., and formed by mold injection. The first bottom part 11 is provided with two bottom through holes 11a spacing each other. The bottom through holes 11a are long and narrow, and stretched out to a direction where the first unit 10 slides into. Sliding parts 12 are attached to the bottom through holes 11a respectively.

The sliding part 12 has a main body part with a slender member. The main body part is attached to the bottom through holes 11a, and arranged above a second lid part 27 described below. The sliding part 12 has an insertion hole 12a at the intermediate portion of the main body part, and has a locking part 12b at the end of the main body part. The locking part 12b projects inward into the second lid part 27 through the bottom through hole 11a and a guiding hole 27a described later. On the locking part 12b, a through hole 12c is formed. The through hole 12c goes through the side surface of the locking part 12b from top surface of the main body part, and connects the inside of the first unit 10 and the inside of the second unit 20. Between two sliding parts 12, on the first bottom part 11, the first display module 13 is arranged.

The first display module 13 is a flat plate with a rectangle shape, and for example, is constructed of a transparent liquid crystal display instrument. The liquid crystal display instrument includes a liquid crystal panel, however a backlight is not arranged behind the liquid crystal panel. A display mode of the liquid crystal panel is normally white. The liquid crystal panel is constructed by sandwiching transparent liquid crystal (not illustrated) and transparent electrodes (not illustrated) between two transparent plates (not illustrated). An electrode 13a is provided at the edge of the first display module 13, and the first input module 14 is overlapped on the first display module 13.

The electrode 13a connects the transparent liquid crystal display instrument and a wiring 15. A flexible substrate is used for the wiring 15. The wiring 15 passes through the through hole 12c of the locking part 12b and enters into the second lid part 27.

For the first input module 14, a touch sensor and so on are used to detect whether a user touched the surface and to detect where the user touched. The touch sensor is a transparent rectangular sheet and two transparent electrodes (not illustrated) are incorporated in the touch sensor in matrix state. A wiring of the first input module 14 is, as the same with the wiring 15 of the first display module 13, guided into the second lid part 27 through the through hole 12c of the locking part 12b.

The first lid part 16 is put on top of the first bottom part 11 so as to cover the first input module 14. The first lid part 16 is made from the transparent resin, such as polycarbonate, acrylic, etc., and formed by mold injection. On the first lid part 16, a first display surface 16b is formed, and the first display surface 16b is arranged on a range where an area overlapping with the first display module 13 or the second display module 25. Also, the first lid part 16 provides two lid through holes 16a. The lid through holes 16a are provided on top of the bottom through hole 11a, and cover parts 17 are attached on the lid through holes 16a respectively.

The cover part 17 is made from opaque resin and formed by mold injection. The cover part 17 covers with the sliding part 12 stored in the bottom through hole 11a. The cover part 17 is provided with a screw hole 17a. By putting a screw 18 in the screw hole 17a and the insertion hole 12a of the sliding part 12, the sliding part 12 and the cover part 17 are connected lengthwise.

By being connected the sliding part 12 and the cover part 17, the first lid part 16 and the first bottom part 11 are fixed, and then the first unit 10 is assembled.

The second unit 20 is provided with a second bottom part 21. The second bottom part 21 is rectangle, and the size is almost the same with the first lid part 16. Inside the second bottom part 21, holding parts 21a are provided. The holding parts 21a are elongated protrusions, and the holding parts 21a stretch out to the direction where the first unit 10 slides to. Receiving parts 26 are arranged on the holding parts 21a respectively.

The receiving part 26 has a bottom plate and a side plate, and the receiving parts 26 stretch out to the direction where the first unit 10 slides to. The receiving parts 26 are arranged under the guiding hole 27a, and are attached to the locking part 12b protruded from the guiding hole 27a.

A battery 22 is arranged inside the second bottom part 21, and a substrate 23 is superimposed over the battery 22. On the surface of the substrate 23, a connector 23a and electronic components (not illustrated), such as a CPU and a memory, etc., are arranged. Between the connector 23a and the electric components is connected by a wiring (not illustrated). Also, the connector 22a is provided next to the battery 22. The connector 22a is connected to the substrate 23 and the battery 22, and also is connected to the wiring 15 of the first display module 13 and the wiring of the first input module 14. The second display module 25 is superimposed on the substrate 23.

The second display module 25 is, for example, constructed of a non-transparent liquid crystal display instrument. The liquid crystal display instrument has a liquid crystal panel 25a and an illuminating part for illuminating the liquid crystal panel 25a. The liquid crystal panel 25a is constructed by sandwiching transparent liquid crystal (not illustrated) and transparent electrodes (not illustrated) between two transparent plates (not illustrated). The illuminating part includes a light guide plate 25b and a light emitting part 25c. The light guide plate 25b is arranged next to the light emitting part 25c and under the liquid crystal panel 25a so as to guide the light from the light emitting part 25c to the second display module 25. A second input module 24 is superimposed over the liquid crystal panel 25a.

The second input module 24 provides, for example, a touch sensor. The touch sensor is a transparent sheet of a rectangular shape. Two transparent electrodes (not illustrated) are incorporated in the touch sensor in matrix state, and a wiring (not illustrated) is connected to the transparent electrodes.

The light emitting part 25c, the liquid crystal panel 25a and the second input module 24 are arranged with wirings (not illustrated) respectively, and these wirings are connected to the substrate 23.

The second lid part 27 is connected to the second bottom part 21 and forms the second unit 20. In the middle of the second lid part 27, a transparent display window is formed. The display window is the second display surface 27b, provided in parallel with the second display module 25 and is positioned at the same range as the second display module 25 is positioned. Also, the second lid part 27 is provided with two guiding holes 27a spacing each other. Since the locking part 12b passes through the guiding hole 27a, the locking part 12b is locked at the edge of the second lid part 27 which surrounds the guiding hole 27a, therefore the first unit 10 and the second unit 20 are connected.

<Operation of Portable Terminal Device 1>

Figure 3:
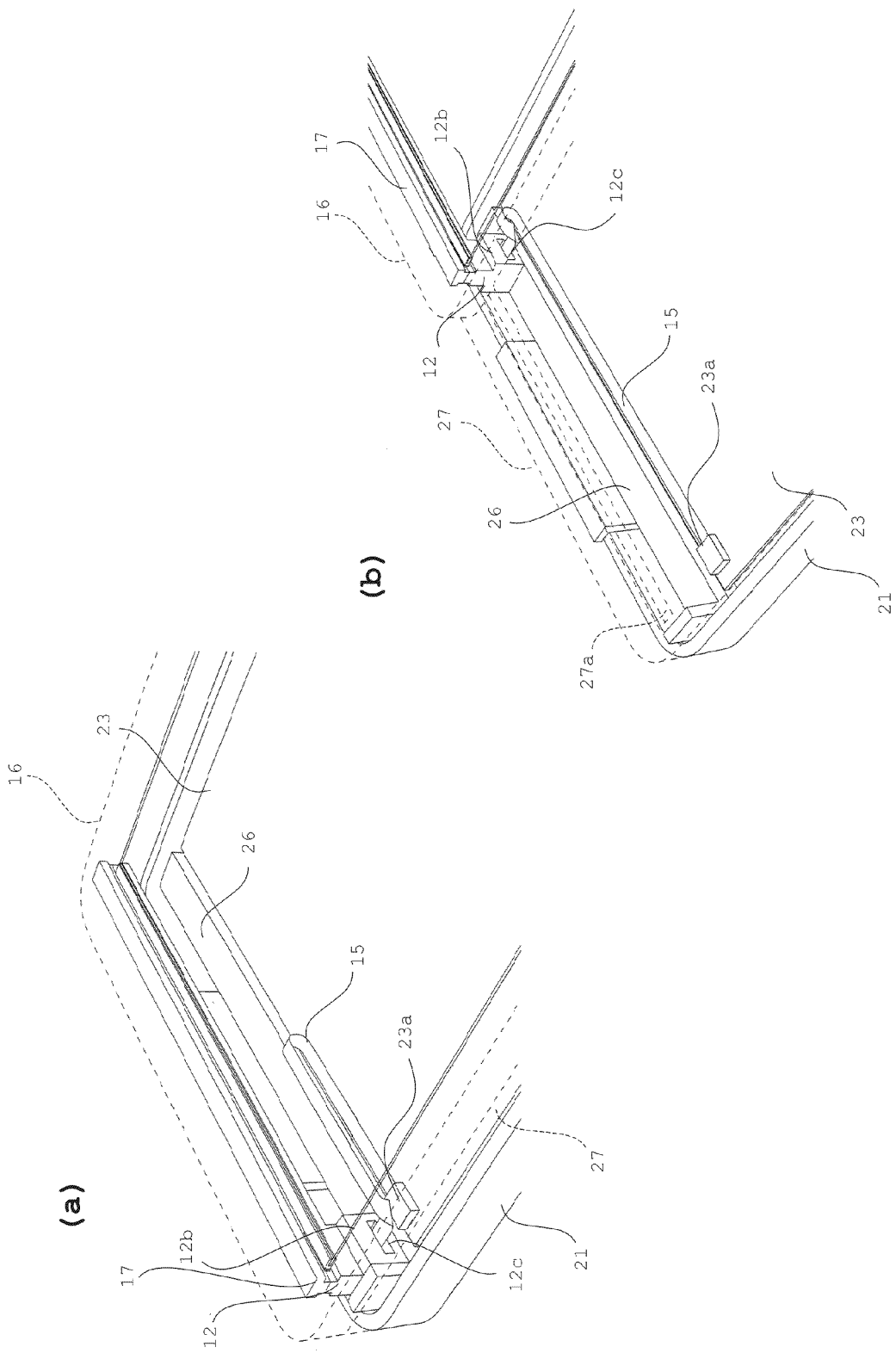
FIGS. 3(a) and 3(b) are diagrams showing perspective views to explain operations of the portable terminal device according to the embodiment.

FIG. 3(a) is a perspective view showing the wiring 15 when the first unit 10 and the second unit 20 are overlapped. FIG. 3(b) is a perspective view showing the wiring 15 when the first unit 10 and the second unit 20 are aligned. It is noted that in FIGS. 3(a) and 3(b), to show the wiring 15 clearly and simply, a part of the components such as the first lid part 16 is illustrated with dashed lines.

As in FIG. 1(a), when the portable terminal device 1 is folded, and the first unit 10 and the second unit 20 are overlapped to each other, the first display surface 16b is shown outside, and the second display surface 27b is hidden under the first unit 10. From now on, this state of the portable terminal device 1 is called closed state, and the display configuration is called the first configuration.

In the first configuration, as shown in FIG. 3(a), the locking part 12b of the sliding part 12 is located at one edge of the guiding hole 27a, that is, near the connector 23a of the substrate 23. The wiring 15 stretches from the through hole 12c of the locking part 12b along the receiving part 26, and along the way, bends to return toward the through hole 12c along the receiving part 26, then connects to the connector 23a.

On the other hand, as shown in FIG. 1(b), when the portable terminal device 1 is opened up, and the first unit 10 is pulled out to the side of the second unit 20, both the first display surface 16b and the second display surface 27b are shown exteriorly. At this time, an end of the first unit 10 is slightly overlapping the end of the second display surface 27b, and the first display surface 16b and the second display surface 27b are aligned side by side with no gap between them. Hereinafter, this state of the portable terminal device 1 is called open state, and this display configuration is called the second configuration.

In the second configuration, as shown in FIG. 3(b), the locking part 12b of the sliding part 12 moves from one end to the other end of the guiding hole 27a, and the guiding hole 27a opens. The locking part 12b moves away from a position of the connector 23a of the substrate 23, and the wiring 15 extends from the through hole 12c of the locking part 12b to the connector 23a of the substrate 23 linearly.

It is noted that by switching between the first configuration and the second configuration, the second unit 20 moves between the first position that the second unit 20 superimposes over the first unit 10 in the first configuration and the second position that the second unit 20 aligns with the first unit 10 in the second configuration.

<Circuit of Portable Terminal Device 1>

Figure 4:
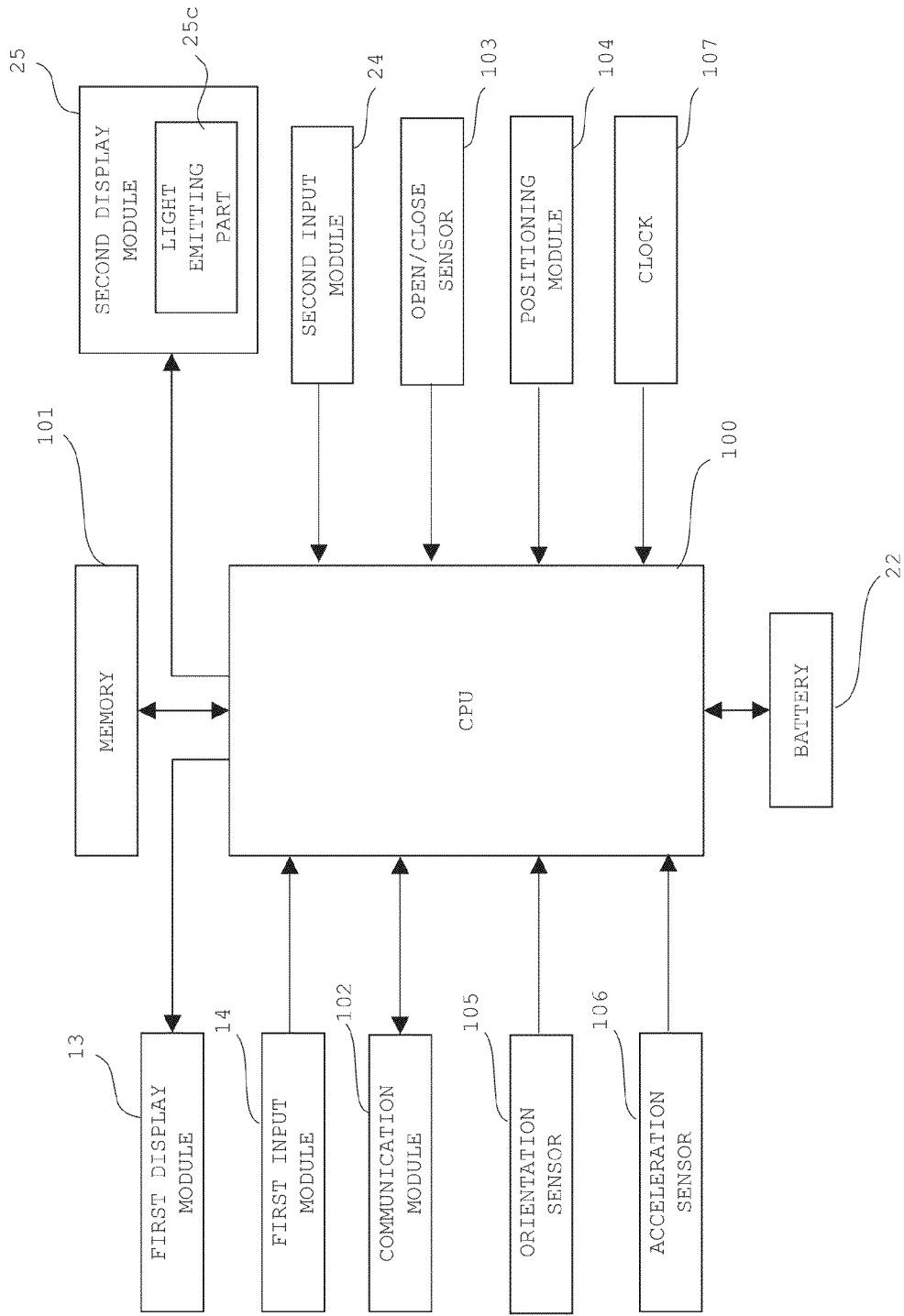
FIG. 4 is a block diagram showing a circuit of the portable terminal device according to the embodiment.

FIG. 4 is a block diagram showing a circuit of the portable terminal device 1.

The portable terminal device 1 of the present embodiment comprises a CPU 100, a memory 101, a communication module 102, an open/close sensor 103, positioning module 104, a direction sensor 105, an acceleration sensor 106 and a clock 107 other than the above components.

The first display module 13 and the second display module 25 receive image signals from the CPU 100. By impressing a voltage to the transparent electrodes of each display module 13 and 25 based on these image signals, orientation of the liquid crystal is changed, and the light passing the liquid crystal is modulated. This allows each display module 13 and 25 to display images, such as figures, e.g. icons, a keyboard, etc., pictures, letters, drawings and windows, and so on. The images displayed by the first display module 13 are shown on the first display surface 16b of the first lid part 16 through the transparent first input module 14. The images displayed by the second display module 25 are shown on the second display surface 27b of the second lid part 27 through the transparent second input module 24. However, in the first configuration, if the first display module 13 is transparent, the images displayed by the second display module 25 are shown on the first display surface 16b through the transparent first display module 13. For this reason, on the first display surface 16b, images from the first display module 13 or the images from the second display module 25 are displayed.

Also, in the first display module 13, in a display area where the voltage is not applied, transmittance becomes maximum and the light is transmissive. Then, since the first lid part 16, first input module 14 and first bottom part 11 which sandwich the first display module 13 are transparent, a display area where the light transmits in the first display module 13 is transparent or translucent, and the display area is see-through state that a scenery behind the first display module 13 can be seen.

Electricity is supplied to the light emitting part 25c of the second display module 25 from the battery 22 according to a control signal from the CPU 100. As a result, the light emitting part 25c emits light. The emitted light enters into the light guiding plate 25b from the side surface of the light guiding plate 25b, and while the light is reflecting inside the light guiding plate 25b, a part of the light comes out from the surface of the light guiding plate 25b to the liquid crystal panel 25a side. As a result, the light is emitted evenly from all over the light guiding plate 25b, and the light is irradiated onto the liquid crystal panel 25a. This makes the image displayed on the second display surface 27b visible. It is noted that, the emitting part 25c is not provided on the first display module 13, the liquid crystal panel 25a of the first display module 13 is illuminated by the light from outside in the first configuration, and is illuminated by the light from the second display module 25 in the second configuration. This makes the image displayed on the first display surface 16b visible.

The first input module 14 detects changes of capacitance between the transparent electrodes. Because of this, when the capacitance is changed at a position where a user's finger, etc., has touched on the first display surface 16b, the first input module 14 outputs a signal according to the touched position by the user to the CPU 100. As a result, the position shown by the user on the first display surface 16b can be detected. It is noted that, in the second configuration, since the image displayed by the first display module 13 is shown on the first display surface 16b, the first input module 14 detects the position designated on the image of the first display module 13. In the first configuration, when the image from the first display module 13 is displayed on the first display surface 16b, the first input module 14 detects the position designated on the image by the first display module 13. On the other hand, in the first configuration, when the first display module 13 is transparent, and the image by the second display module 25 is shown on the first display surface 16b, the first input module 14 detects the position designated on the image by the second display module 25.

The second input module 24 outputs a signal according to the position touched by a user's finger, etc., on the second display surface 27b, as the same with the first input module 14, to the CPU 100. As a result, the position designated by the user on the second display surface 27b can be detected. It is noted that, in both the first configuration and the second configuration, since the image displayed by the second display module 25 is shown on the second display surface 27b, the second input module 24 detects the position designated on the image of the second display module 25.

The battery 22 supplies electricity to the CPU 100, each display module, 13 and 25, each input module, 14 and 24, etc., according to the control signal from the CPU 100.

The memory 101 is a storage module including ROM and RAM. In the memory 101, a control program to grant a control function to the CPU 100 is stored. Besides, in the memory 101, text information, image information and acoustic information are stored in predetermined file forms. Further, in memory 101, images such as icons displayed on display surfaces 16b and 27b and positions where these images are located are associated with each other and stored. Also, in the memory 101, a point information database shown in FIG. 5 is stored. The point information database includes longitude and latitude of a point position, date and time the point position is set, and comments on the point position.

The communication module 102 converts an audio signal, an image signal and a text signal, etc., from the CPU 100 into radio signals and transmits the radio signals to a base station via an antenna. Also, the communication module 102 converts the received radio signals into the audio signal, the image signal, the text signal and so on and outputs these signals to the CPU 100.

An Open/close sensor 103 is arranged at a position near a magnet in the first configuration, and the magnet is arranged near the locking part 12b. The open/close sensor 103 is connected to substrate 23 by a wiring, and between the open/close sensor 103 and the CPU 100 on the substrate 23, signals are transmitted and received. In the first configuration, when the magnet exists near the open/close sensor 103, the open/close sensor 103 detects a magnetic field, and outputs a detection signal of close to the CPU 100. On the other hand, in the second configuration, when the magnet is located far from the open/close sensor 103, the open/close sensor 103 does not detect the magnetic field, nor outputs the detection signal of close to the CPU 100.

A positioning module 104 receives a signal, etc., from a GPS satellite, obtains a position from this signal, and outputs a signal according to the position to the CPU 100.

An acceleration sensor 106 is a tilt detecting module for detecting gravity acceleration generated in a direction of the Z axis of FIG. 1(a) and for detecting the tilt of the first display module 13 by the gravity acceleration. The acceleration sensor 106 is arranged so as the gravity acceleration to become +1G when a back surface of the first display module 13 is horizontal and facing up of the vertical direction, and also is arranged so as the gravity acceleration to become −1G when the back surface of the first display module 13 is horizontal and facing down of the vertical direction. The acceleration sensor 106 outputs the acceleration signals according to the detected acceleration to the CPU 100. Here, the Z axis direction shows a normal direction of the first display surface 16b. Also, the first display module 13 has a front surface and a back surface, and the front surface of the first display module 13 is facing the first display surface 16b. Thus, when the back surface of the first display module 13 faces down of the vertical direction, the first display surface 16b faces up of the vertical direction. At this moment, a user faces the first display surface 16b, and sees a scenery behind the first display module 13, that is the ground at the user's feet through the first display surface 16b and the first display module 13.

An orientation sensor 105 is an orientation detecting module, and outputs signals according to the detected orientation to the CPU 100. A geomagnetic sensor, gyro sensor, etc., are used for the orientation sensor 105. The orientation sensor 105 includes a first orientation sensor and a second orientation sensor. The first orientation sensor detects the orientation the back surface of the first display module 13 is facing (hereinafter, it is referred to as "back surface orientation") while the first display module 13 is set up. It is noted that the back surface orientation shows the orientation of −Z axis direction of FIG. 1(a). Also, the second orientation sensor detects the orientation a first end part of the first display module 13 is facing (hereinafter, it is referred to as "end part orientation") while the first display module 13 is laid down. It is noted that the first display module 13 includes the first end part and the second end part. The first end part and the second end part bisect at right angles to the direction the first unit 10 slides against the second unit 20. When the portable terminal device 1 is in a state of the second configuration, the first end part is positioned on a far side from the second unit 20 compared to the second end part. The end part orientation shows the orientation of +X axis direction of FIG. 1(a).

A clock 107 measures time and date, and outputs time and date information to the CPU 100.

As a display control module to control the display module, the CPU 100 has each display module, 13 and 25, display images, sets the first display module 13 to be in a see-through state, or lets an illumination of the second display module 25 to be lit.

That is, the CPU 100 obtains text information and image information by reading out the information from the memory 101 and by receiving the information through the communication module 102. The CPU 100 outputs the information as image signals to the first display module 13 and the second display module 25, respectively, and has each display module, 13 and 25, display the images on each display surface, 16b and 27b. For example, the CPU 100 has the first display module 13 display an arrow showing a traveling direction, a point mark PM showing a destination position and point information such as a date and comments, etc., set at the destination position as information showing the destination position on the first display surface 16b.

Also, the CPU 100 controls a voltage impressed to a transparent electrodes by outputting the control signal to adjust electricity provided from the battery 22 to the first display module 13 and changes transmittance of the first display module 13. This makes the CPU 100 set the display area other than the image displayed to be in a see-through state on the first display surface 16b.

Further, when the image is displayed by the second display module 25, the CPU 100 makes the battery 22 supply electricity to the light emitting part 25c and makes the light emitting part 25c emit light.

The CPU 100, as the position obtaining module, receives a signal according to the position from the positioning module 104, and obtains a current position of the portable terminal device 1. Coordinates showing spots on the earth such as a latitude and longitude, etc., are obtained as positions.

The CPU 100 is a direction obtaining module, and as mentioned below, obtains a direction from the current position to the destination position and a traveling direction from the current position to the destination position.

The CPU 100, as a determination module, determines whether the back surface of the first display module 13 faces down by receiving an acceleration signal from the acceleration sensor 106. It is noted that, in determining the direction the back surface of the first display module 13 is facing, it is possible to set an acceptable range: αG from a gravity acceleration −1 G. For this reason, when the gravity acceleration is not more than a predetermined threshold: (−1+α)G, the determination module determines that the back surface of the first display module 13 is facing down.

The CPU 100 is a registration module, and registers the position from the position obtaining module, the date and the time from the clock 107, information from the second input module 24, etc., to the point information database.

The CPU 100 transmits requests including the current position and point position, etc., to a map server through the communication module 102. The CPU 100 receives the map information delivered according to this request from the map server through the communication module 102, and displays the map on the second display module 25. It is noted that the map information includes the information to display the map image and the information to match the coordinate on the map and the coordinate on the earth. The information to display the image of the map can be image information of a map or data for constructing the map. When the information is the data to construct the map, a program written especially for displaying the map is previously installed in the portable terminal device 1, by converting the data constructing the map to the image information of the map with the special program, the map is displayed by the second display module 25. Also, the map is an image of a range including the current position and the point position.

<Functions of Portable Terminal Device 1>

Figure 6:
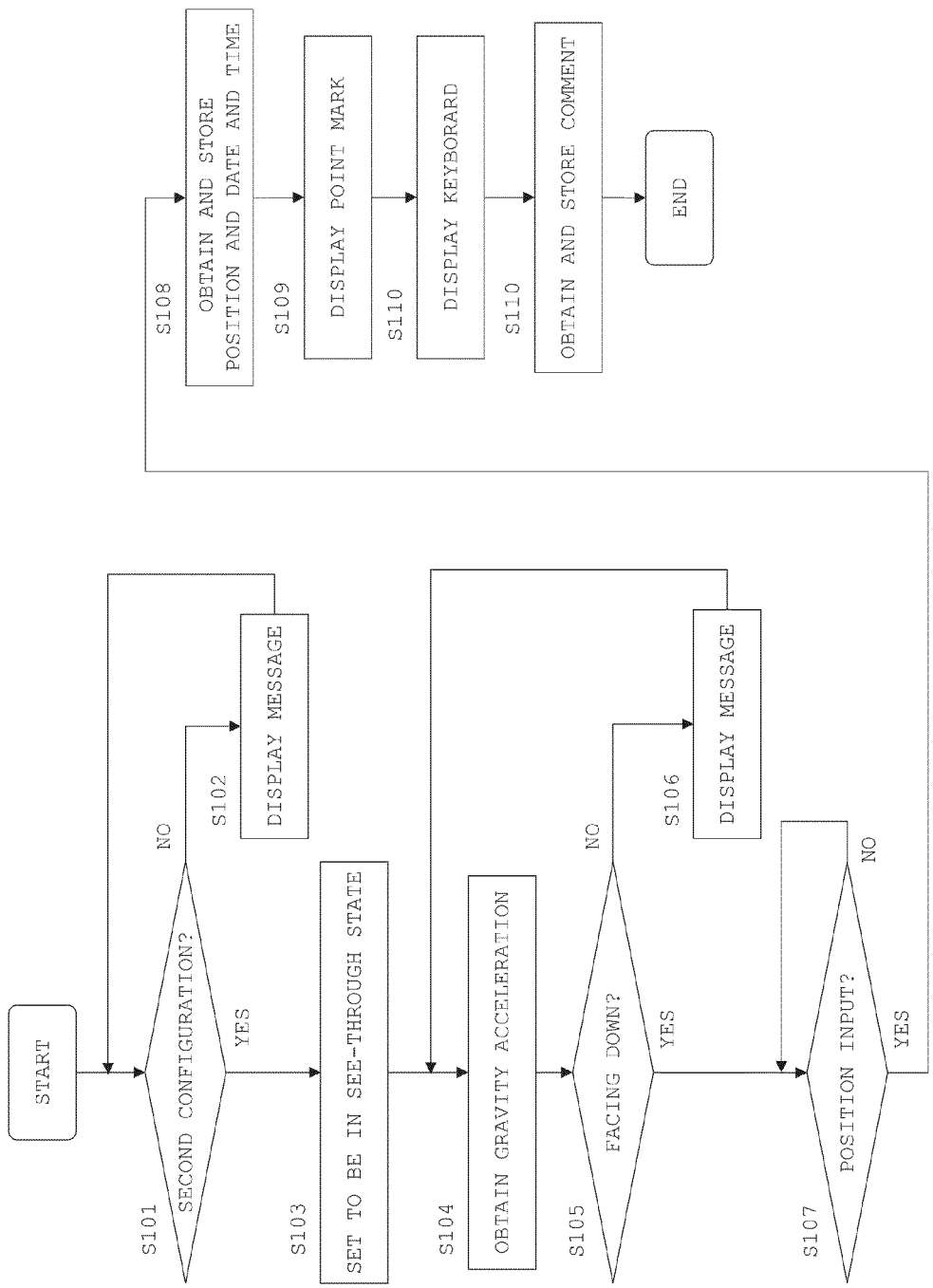
FIG. 6 is a flow chart showing a procedure for processing to set the point information according to the embodiment.
Figure 7:
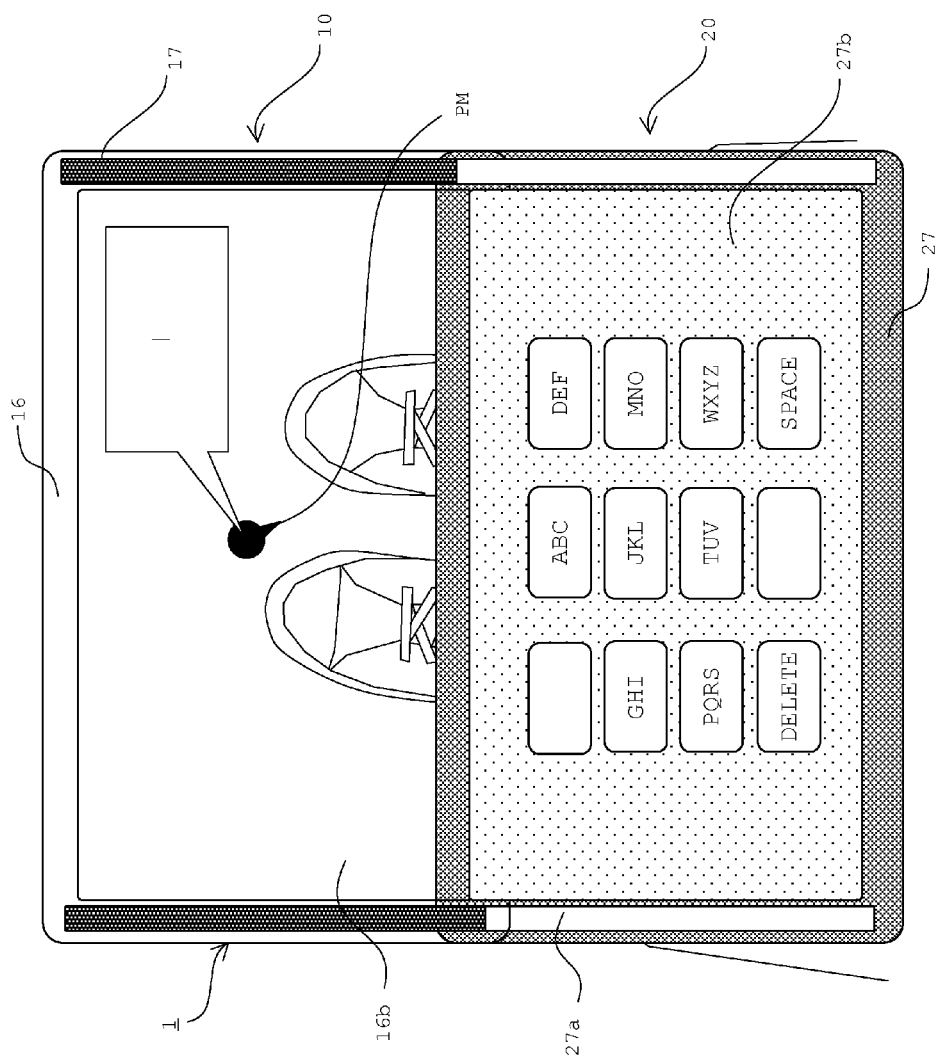
FIG. 7 is a diagram showing a state setting the point information according to the embodiment.

FIG. 6 is a flow chart showing a procedure for processing to set the point information. FIG. 7 is a diagram showing a state setting the point information.

The CPU 100 displays an operation menu on the first display surface 16b or the second display surface 27bWhen the user touches a position of an icon of the point information setting from the operation menu, a function to set the point information is selected, and a control program for the function to set the point information is activated.

First, the CPU 100 determines whether the portable terminal device 1 is in the second configuration or not (S101). Then, when the detection signal of close from the open/close sensor 103 is input, the CPU 100 determines that the portable terminal device 1 is in the close state, and this display configuration is the first configuration but not the second configuration (S101: NO). Then, the CPU 100 reads out predetermined message information from the memory 101, and displays a message such as "please open the portable terminal device 1" on the first display surface 16b (S102). The message prompts the user to make the portable terminal device 1 be the second configuration.

On the other hand, when the detection signal from the open/close sensor 103 is not input, the CPU 100 determines that the portable terminal device 1 is in open state, and determines that this display configuration is the second configuration (S101: YES). Then, the CPU 100 sets the first display surface 16b to be see-through state (S103) by making the first display module 13 transparent. For this reason, in the portable terminal device 1 of the second configuration, since nothing is overlapped underneath of the first unit 10, a scenery behind the first display surface 16b can be seen.

The CPU 100 obtains the gravity acceleration from the acceleration sensor 106 (S104). The CPU 100 compares the gravity acceleration and a predetermined threshold: (−1+α) G, and from the result of the comparison, the CPU 100 determines whether the back surface of the first display module 13 is facing down or not (S105). That is, the gravity acceleration is bigger than the predetermined threshold, the CPU 100 determines that the back surface of the first display module 13 is not facing down (S105: NO). In this case, the CPU 100 read out predetermined message information from the memory 101, and displays a message such as "please put the display module face down," etc., on the first display surface 16b (S106). This prompts the user to put the back surface of the first display module 13 to be faced down.

On the other hand, when the gravity acceleration is equal to or less than the predetermined threshold, the CPU 100 determines that the back surface of the first display module 13 is facing down (S105: YES). In this case, the user who put the back surface of the first display module 13 to be faced down can look for a position to set the point while looking at the ground through the first display surface 16b in its see-through state. When the point position is decided, the user puts the center of the first display surface 16b on the set position of the point, and inputs the point position by touching the center of the first display surface 16. This makes the CPU 100 to determine that there is a positioning input according to the position signal from the input module (S107: YES).

When the point position is set, the CPU 100 obtains a position (latitude and longitude, for example, latitude 35 degrees 63 minutes, longitude 139 degrees 88 minutes) from the positioning module 104, and stores the obtained position in a point information database shown in FIG. 5 as the point position. Also, the CPU 100 obtains a date and a time (for example, Aug. 2, 2010) from the clock 107, relates the date and the time obtained with the point position, and stores the date and the time in the position information database (S108). It is noted that the date and the time can be obtained from a network connected to the portable terminal device 1, instead of the date and the time data from the clock 107 inside the portable terminal device 1.

As shown in FIG. 7, the CPU 100 displays a comments field on the first display surface 16b and displays a point mark PM which has a shape of a pin in the center of the first display surface 16b (S109). Also, the CPU 100 displays the keyboard of software on the second display surface 27b for inputting a comment (S110). Then, the user touches the keyboard on the second display surface 27b and inputs characters. With inputting the characters, the CPU 100 receives characters from the input module and displays characters in the comments field. Besides, when the input characters are confirmed, the CPU 100 stores the characters in a comments field of the point information database (S110). Therefore, the latitude, longitude, date and time, and comments are related together and input to the point information database as the point information.

Figure 8:
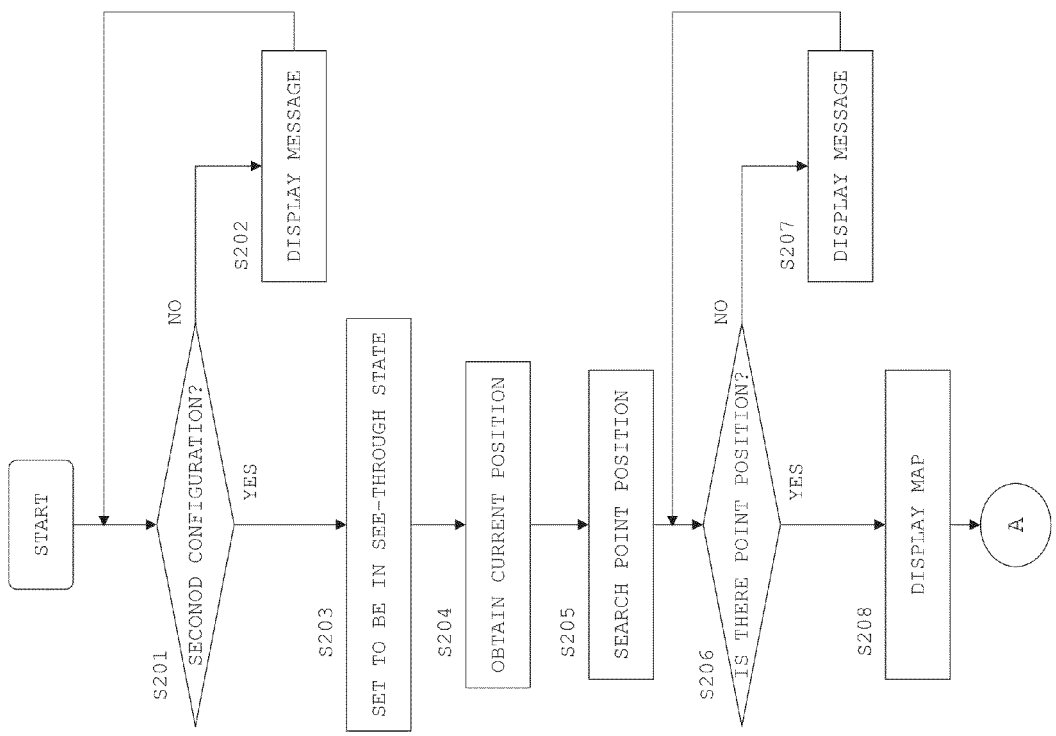
FIG. 8 is a flow chart showing a procedure for processing to display the point information according to the embodiment.
Figure 9:
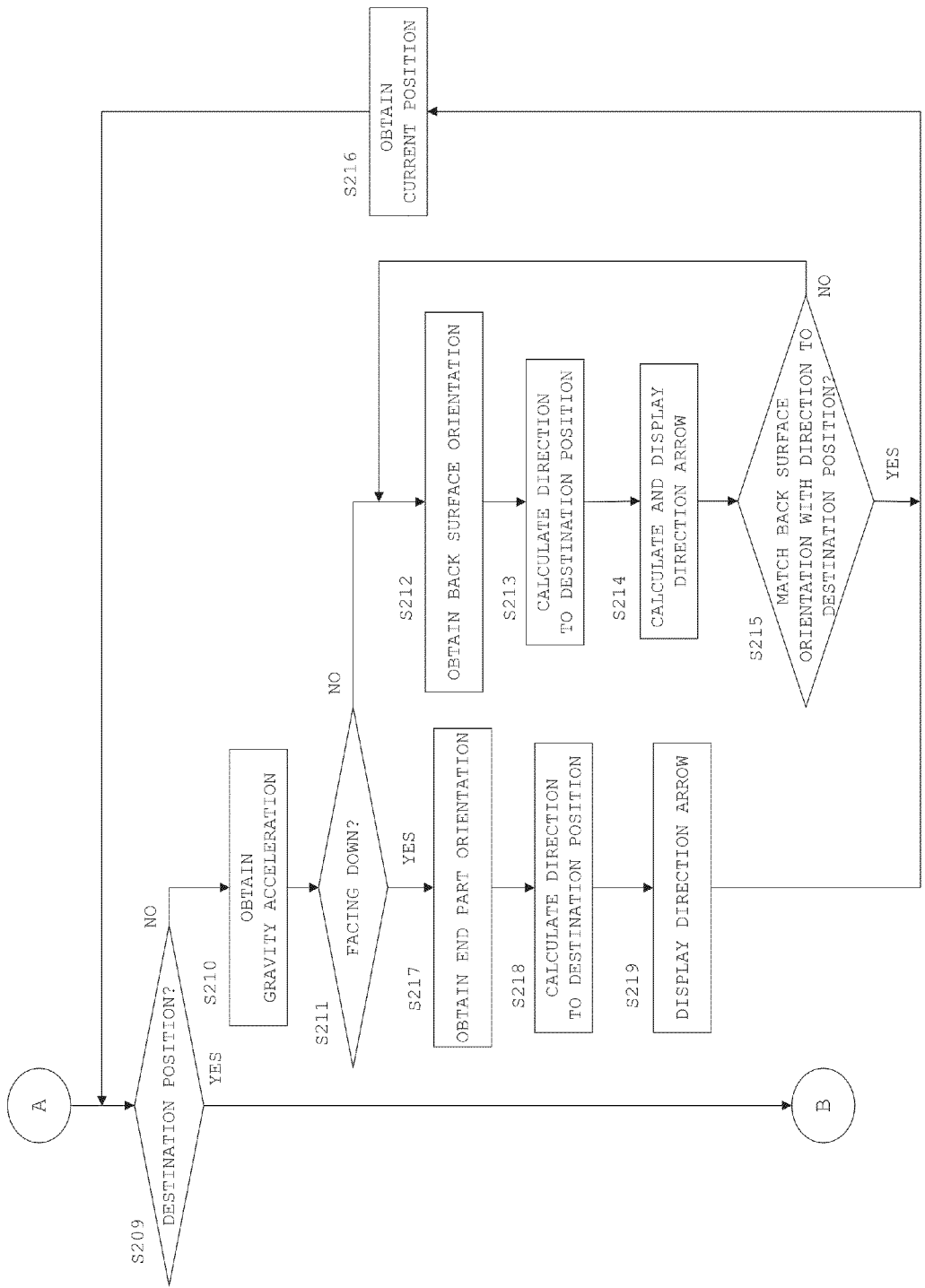
FIG. 9 is a flow chart showing a procedure for processing to display the point information according to the embodiment.
Figure 10:
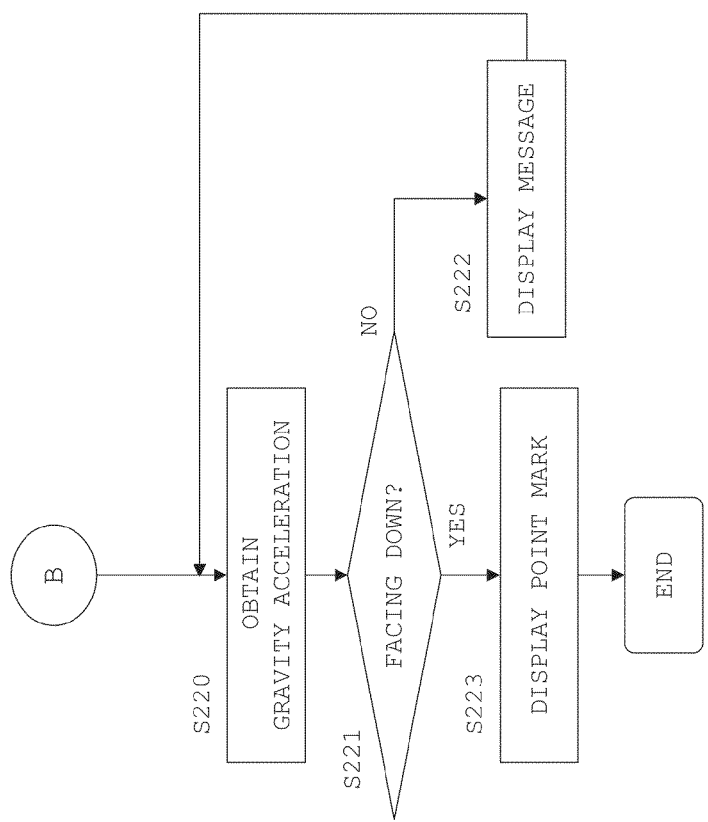
FIG. 10 is a flow chart showing a procedure for processing to display the point information according to the embodiment.
Figure 11:
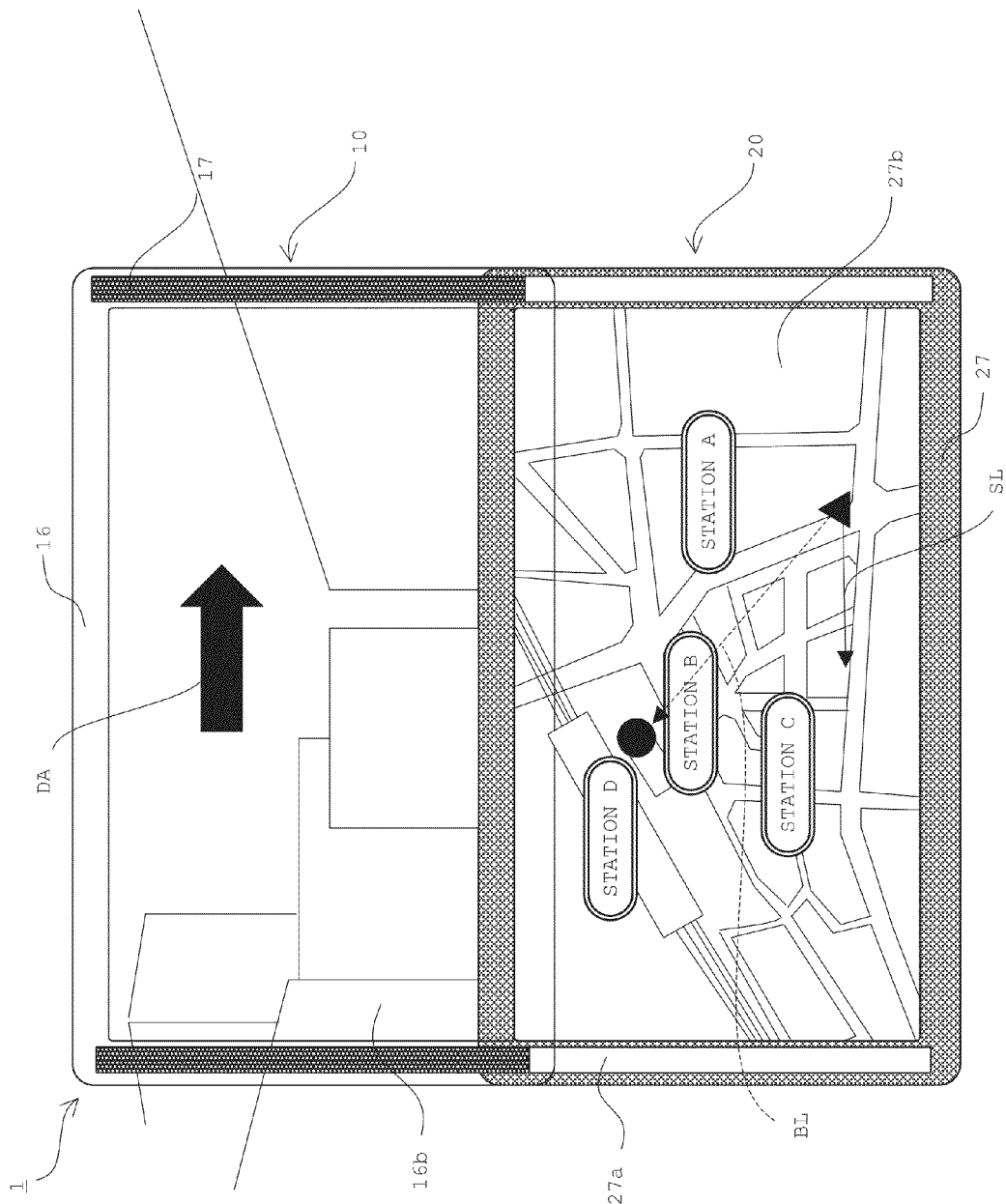
FIG. 11 is a diagram showing a state displaying an arrow showing a traveling direction according to the embodiment.
Figure 12:
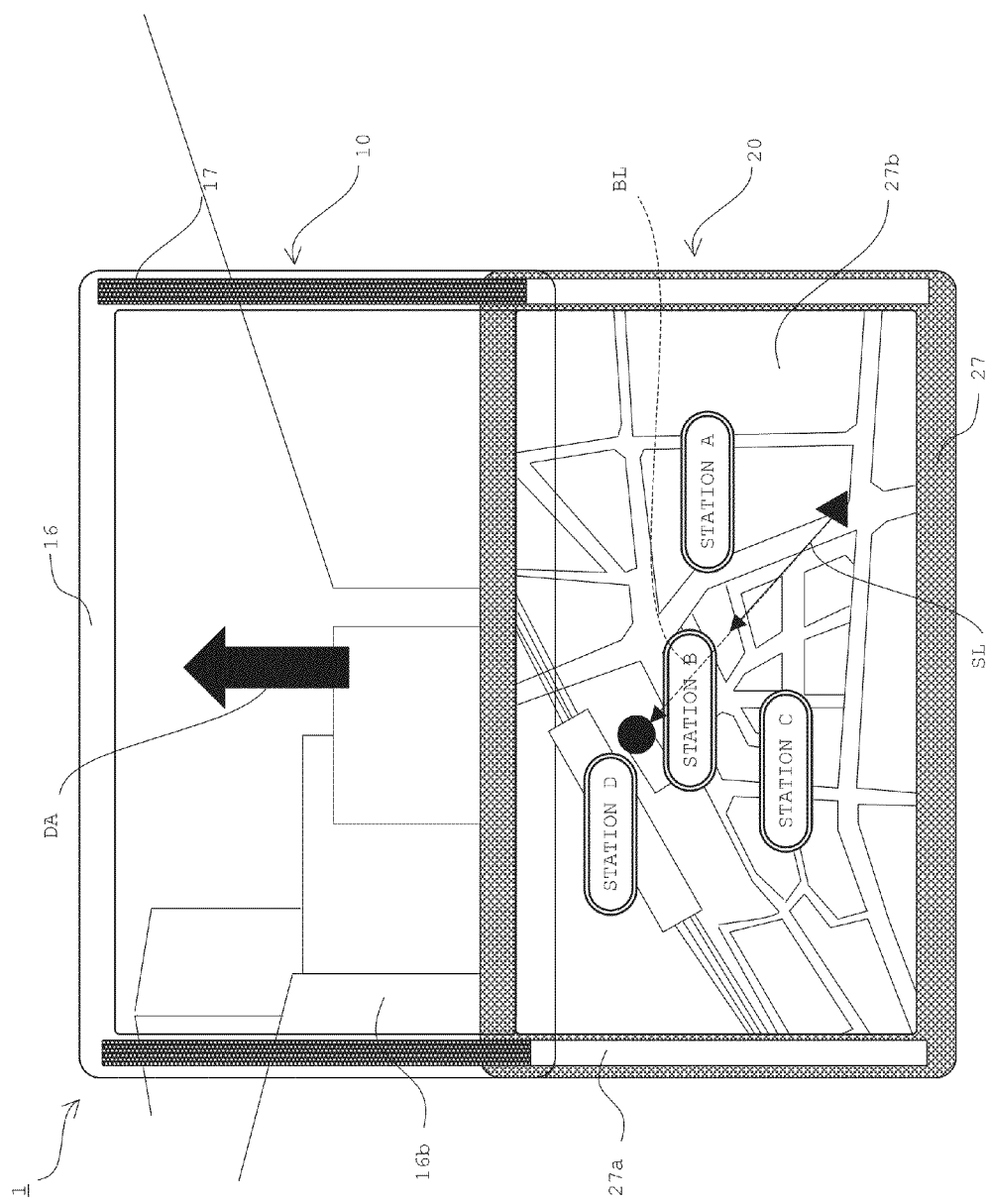
FIG. 12 is a diagram showing the state displaying the arrow showing the traveling direction according to the embodiment.
Figure 13:
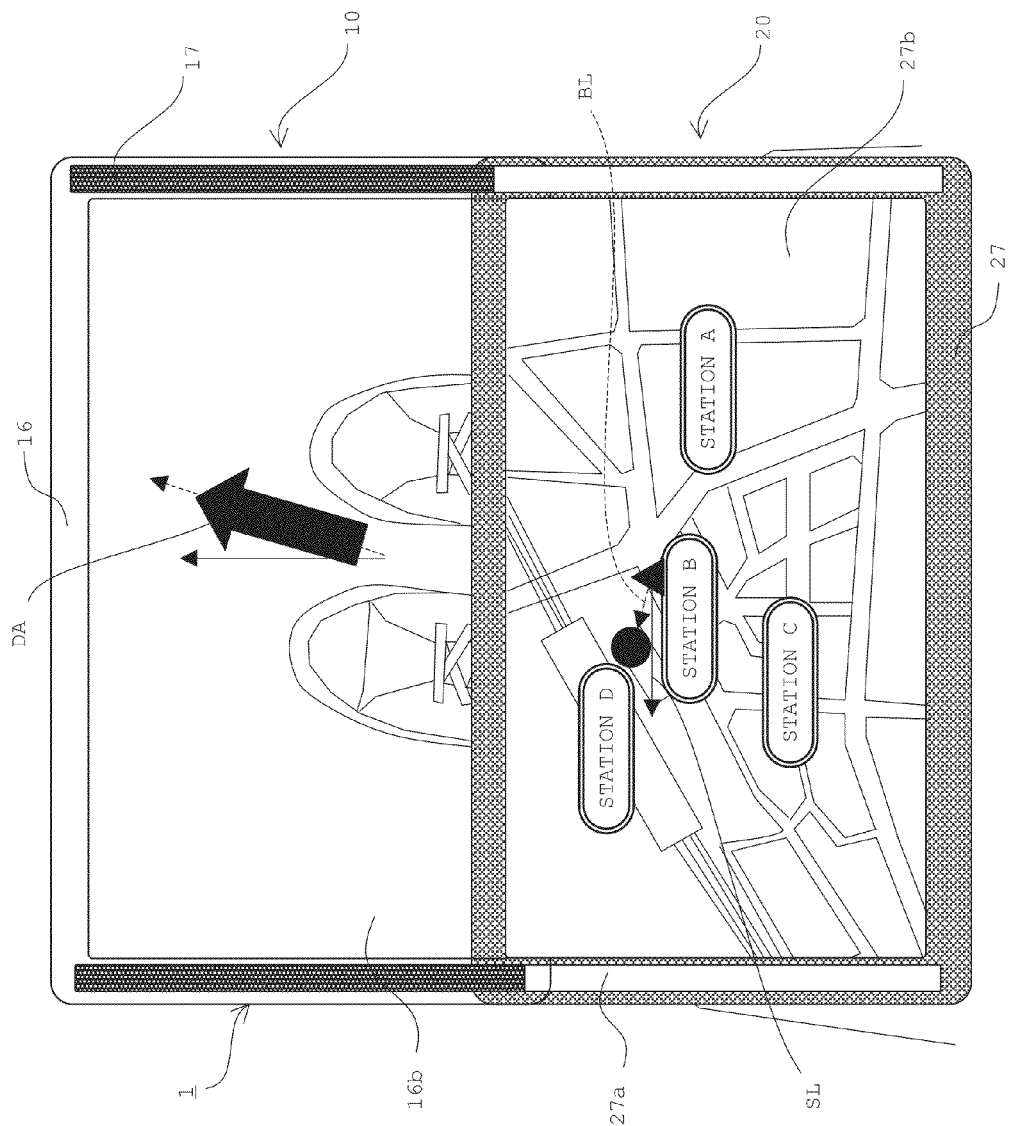
FIG. 13 is a diagram showing the state displaying the arrow showing the traveling direction according to the embodiment.
Figure 14:
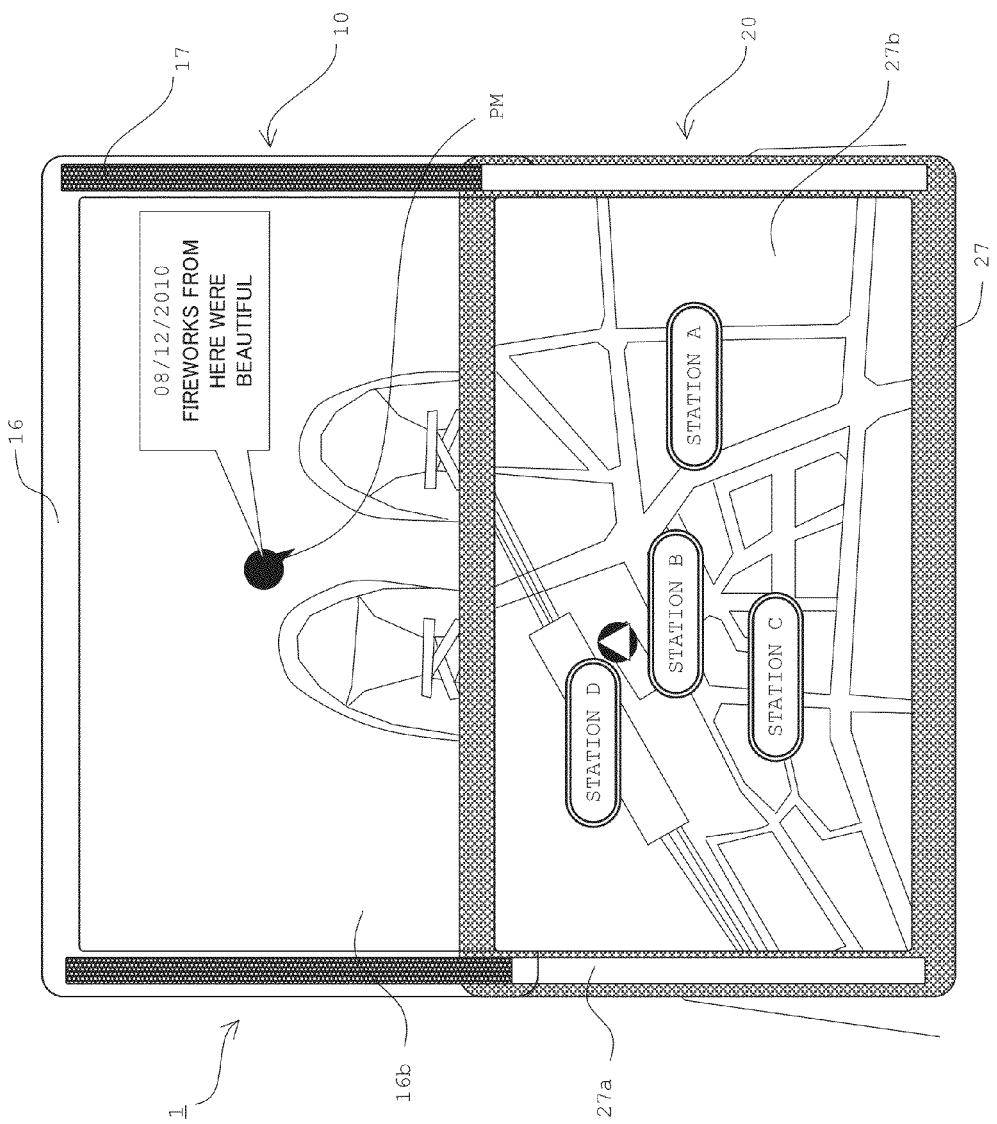
FIG. 14 is a diagram showing the state displaying a point mark according to the embodiment.

FIGS. 8-10 are flow charts showing procedures for processing to display to guide the user to a registered point by a point mark PM. FIGS. 11 and 12 show a state displaying an arrow DA of a traveling direction showing the direction of a point position on the first display surface 16b when the user see the horizontal direction through the first display surface 16b. FIG. 13 shows the state displaying the arrow DA of the traveling direction on the first display surface 16b when the user sees directly beneath through the first display surface 6b. FIG. 14 shows the state displaying the point mark PM showing a point position on the first display surface 16bwhen the user sees directly beneath through the first display surface 16b.

The CPU 100 displays the operation menu on the first display surface 16b or the second display surface 27b. When the user touches a position of an icon of a point display among the operation menu, a function to guide the user to a registered point by a point mark PM is selected, and a control program for the function to guide the user is activated.

The CPU 100 determines whether the portable terminal device 1 is in the second configuration or not (S201). When the CPU 100 has received a detection signal from the open/close sensor 103, the CPU 100 determines that the portable terminal device 1 is not in the second configuration (S201:

NO). Then, the CPU 100 reads out predetermined message information from the memory 101, and displays a message inducing the user to change the status of the portable terminal device 1 from the first configuration to the second configuration on the second display surface 27b (S202).

When the CPU 100 has not received a detection signal from the open/close sensor 103, the CPU 100 determines that the portable terminal device 1 is in the second configuration (S201: YES). In the second configuration, nothing is overlapped with the first unit 10, so to make it possible to see the back ground scenery through the first unit 10, the CPU 100 makes the first display module 13 to be transparent and set the first display surface 16b to be in the see-through state (S203).

The CPU 100 obtains a latitude and longitude of a current position from the positioning module 104 (S204). Then, the CPU 100 compares the latitude and longitude of the current position with the latitude and longitude of the point position of the point information database as the comparison module, and searches the point position within a certain range from the current position (S205). It is noted that the certain range can be a predetermined range or a display area set arbitrarily by the user.

As a result of the search, when there is no point position in the certain range from the current position, the CPU 100 determines that the point position of the current position does not exist (S206: NO). Therefore, the CPU 100 reads out a predetermined message from the memory 101, and displays a message such as "there is no point position around here" and so forth on the first display surface 16b.

On the other hand, when there is a point position at the certain range from the current position, the CPU 100 determines that there is a point position around the current position (S206: YES), and sets the searched point position as a destination position. Then, when a plurality of point positions is found, one point position from the plurality of point positions is selected, and this point position is set to be the destination position. For example, the CPU 100 obtains the nearest point position from the current position, and makes this point to be the destination position. Also, the plurality of searched point positions may be displayed on each display surface 16b and 27b as a map or a list format, etc., and the user can choose the destination position from these positions.

The CPU 100 transmits the current position and the destination position to a map server and receives map information from the map server according to those positions. The CPU 100 transforms the latitude and longitude of the current position and the destination position into the coordinates on the map based on the information matching the coordinate on the map included in the map information and the coordinate on the earth. Then, as shown in FIG. 14, the CPU 100 displays a map, a present location mark showing the current position and a destination mark showing the destination position on the second display surface 27b (S208). It is noted that, on the map, the present location mark is shown with ▲, and the destination mark is shown with ●.

The CPU 100 determines whether the current position is the destination position or not by comparing the current position and the destination position (S209). Then, when the current position and the destination position are different, the CPU 100 determines that the current position is not the destination position (S209: NO). To guide the user from the current position to the destination position, traveling direction is shown.

First, the CPU 100 obtains a gravity acceleration from the acceleration sensor 106 (S210). The CPU 100 compares the gravity acceleration and predetermined threshold: $(-1+\alpha)$ G, and determines whether the back surface of the first display module 13 is facing down or not (S211). Then, when the gravity acceleration is larger than the predetermined threshold, the CPU 100 determines that the back surface of the first display module 13 is not facing down (S211: NO).

At this time, the user holds up the first unit 10, faces the first display surface 16b in a horizontal direction, and sees the scenery in front of the user through the first display module 13 of a see-through state. Then, to obtain the direction the user is seeing, the CPU 100 receives an orientation from the first orientation sensor and obtains the back surface orientation (S212). Also, the CPU 100 calculates a direction from the current position to the destination position based on the current position and the destination position (S213). Then, the CPU 100 displays the back surface orientation by a solid arrow SL and displays the direction to the destination position by a dashed line BL on a map of the second display surface 27b shown in FIGS. 11-12. On the map, the user can figure out the direction himself is seeing from the arrow SL and can figure out the direction of the destination position from the arrow BL.

However, since the display on this map is different from a scenery the user is actually seeing, it is difficult for the user to understand the traveling direction immediately from this display. For this reason, if a direction of the destination position is shown on the first display surface 16b in the see-through state, the user can easily understand the traveling direction based on the scenery actually seeing through the first display surface 16b.

Then, the CPU 100 obtains the positional relationship between the direction to the destination position and the back surface orientation by calculating from the back surface orientation and the direction to the destination position. For example, as shown in FIG. 11, when an arrow BL of the direction to the destination position lies on the right side compared to an arrow SL of the back surface orientation, the traveling direction is the right hand side compared to the direction the user is seeing, the CPU 100 displays an arrow DA of traveling direction to face right hand side on the first display surface 16b. On the other hand, as a result of the previous calculation, when the arrow BL of the destination position lies on the left side compared to the arrow SL of the back surface orientation, the traveling direction is the left hand side compared to the direction the user is seeing, the CPU 100 displays the arrow DA of traveling direction to face left hand side on the first display surface 16b (S214). It is noted that in the above calculation, the back surface orientation and the direction to the destination position are shown in vectors respectively, and outer product and inner product of these are obtained. From these outer product and inner product, the positional relationship between the back surface orientation and the direction to the destination position are obtained.

At this point, the direction the user is seeing is different from the direction to the destination position, the CPU 100 determines that the back surface orientation does not match the direction to the destination position (S215: NO). At this time, as shown in FIG. 11, the user can see the surroundings and the traveling direction integrally by seeing the arrow DA of traveling direction while looking at the actual scenery through the first display surface 16b, so the user can easily figure out the traveling direction. Thus, the user changes the direction of the first display surface 16b to the right side by centering the current position according to the arrow DA of the traveling direction. Here, the CPU 100 repeats the procedures of S212-S215. Then, as shown FIG. 12, when the back surface direction matches with the direction of the destination position (S215: YES), the CPU 100 displays the arrow DA of the traveling direction facing up on the first display surface 16*b*. The user can tell s/he should go straight from the arrow of the traveling direction facing up on the first display surface 16*b*.

Since the user travels toward the destination position according to the arrow DA, the CPU 100 obtains the current position from the positioning module 104 (S216). Then, again, the CPU 100 determines whether the current position matches the destination position (S209).

When the user comes close to the destination position, the user lays the first display module 13, faces down the back surface of the first display module 13, and searches the destination position while looking on the ground through the first display surface 16*b* . Again, the CPU 100 obtains the gravity acceleration (S210). In this case, since the gravity acceleration becomes below the predetermined threshold, the CPU 100 determines that the back surface of the first display module 13 is facing down (S211: YES). As shown in FIG. 13, the user sees own feet through the first display surface 16*b*. In this case, the display direction of the map and the direction of the scenery reflecting on the first display surface 16*b* are matched. That is, both the map and the scenery shown on the first display surface 16*b* display planes parallel to a horizontal plane seeing from top to bottom in vertical direction. Thus, in a state that the first display module 13 is held up, the back surface orientation is the direction the user advances, however when the first display module 13 is laid, the end part orientation is the direction the user advances. Then, the CPU 100 obtains the end part orientation from the second orientation sensor (S217), and as shown in FIG. 13, on the map of the second display surface 27*b*, displays the end part orientation by the solid arrow SL. Also, the CPU 100 calculates the direction from the current position to the destination position based on the current position to the destination position (S218), and displays the direction to the destination position by the dashed line BL. Then, while maintaining the positional relationship between the end part orientation and the direction to the destination position on the map, the CPU 100 adjusts the end part orientation so as to the first display surface 16*b*to face up, the direction to the destination position shows the traveling direction directly. For this reason, the CPU 100 displays the arrow DA of the traveling direction according to the destination position on the first display surface 16*b* (S219).

Again, when the user travels according to the arrow DA of the traveling direction, the CPU 100 obtains the current position from the positioning module 104 (S216), and determines whether the current position matches the destination position or not (S209). Then, as shown in FIG. 14, when the current position matches the destination position, to check whether the back surface of the first display module 13 is facing down, again, the CPU 100 obtains the gravity acceleration from the acceleration sensor 106 (S220), and determines the tilt of the first display module 13 (S221). Here, when the gravity acceleration is bigger than the predetermined threshold, the CPU 100 determines that the back surface of the first display module 13 is not facing down (S221: NO). The CPU 100 displays a message for a user to prompt to face down the back surface of the first display module 13*b* on the first display surface 16*b* (S222).

On the other hand, when the gravity acceleration is equal to or less than the predetermined threshold, the CPU 100 determines that the back surface of the first display module 13 is facing down (S221: YES). The CPU 100 displays a point mark PM in the center of the first display surface 16*b* (S223). Also, the CPU 100 reads out a date, time and comments of point information where the point position is at the destination position from the point information database and displays the date, time and comments on the first display surface 16*b* (S220). For this reason, the information showing the destination position is displayed on the first display surface 16*b*, and the user can see the point position, date and time registered previously with the comments the user input then.

According to the present embodiment, the arrow DA of the traveling direction is displayed on the first display surface 16*b* set to be in the see-through state. Therefore, the user can easily go to the destination position according to the arrow DA of the traveling direction by seeing the arrow DA of the traveling direction while seeing the actual scenery through the first display surface 16*b*. That is, the user does not need to obtain the direction to the actual destination position from the direction to the destination position on the map after corresponding the direction, shown on the map, the user himself is seeing with the direction the user himself is actually seeing.

Also, according to the present embodiment, the arrow DA is displayed on the first display surface 16*b*, and the display area other than that is set to be in the see-through state, at the same time, the map, present location mark and destination mark are displayed on the second display surface 27*b*. With the information displayed on each display surface 16*b* and 27*b*, the user can see the destination position from various perspectives.

Further, according to the present embodiment, the user inputs the position on the first display surface 16*b* while looking at the actual place through the first display surface 16*b* in the see-through state. Therefore, since the current position is registered as the point position, the user can register the point position by designating the point position intuitively.

Also, according to the present embodiment, when the point position is set, the point mark PM with a shape of a pin is displayed on the first display surface 16*b*. For this reason, the user can set the position as the point position on which the user is standing so as to have an impression that a pin is pricked at the feet which the user sees through the first display surface 16*b*.

<Other Embodiments>

The embodiment of the present invention has been described above, however the present invention is not limited to the above embodiment, and the embodiment of the present invention may be variously modified.

In the above embodiment, the CPU 100 obtained the position of the portable terminal device 1 from the signal from the positioning module 104. In contrast, the CPU 100 can receive a signal related to a position via the communication module 102 from a base station in a communication range and obtain the position from this signal.

According to the above embodiment, the destination position is set from point positions the user previously registered, however the destination position can be set to a landmark included in map information. In this case, the map information includes information of names and positions of landmarks included in the map in addition to the image information of the map. The CPU 100 compares the current position and the position of the landmark and sets the position of the landmark to be the destination position.

As other destination position, a position the user picks up on the map can be set. For example, when the user touches the second display surface 27*b* which displays the map, the second input module 24 detects this position. Then, the CPU 100 converts the touched position on the second display surface 27*b* into the position on the map, further converts from the position on the map to the position on the earth (latitude and longitude) based on the map information, and sets the destination position.

Figure 15:
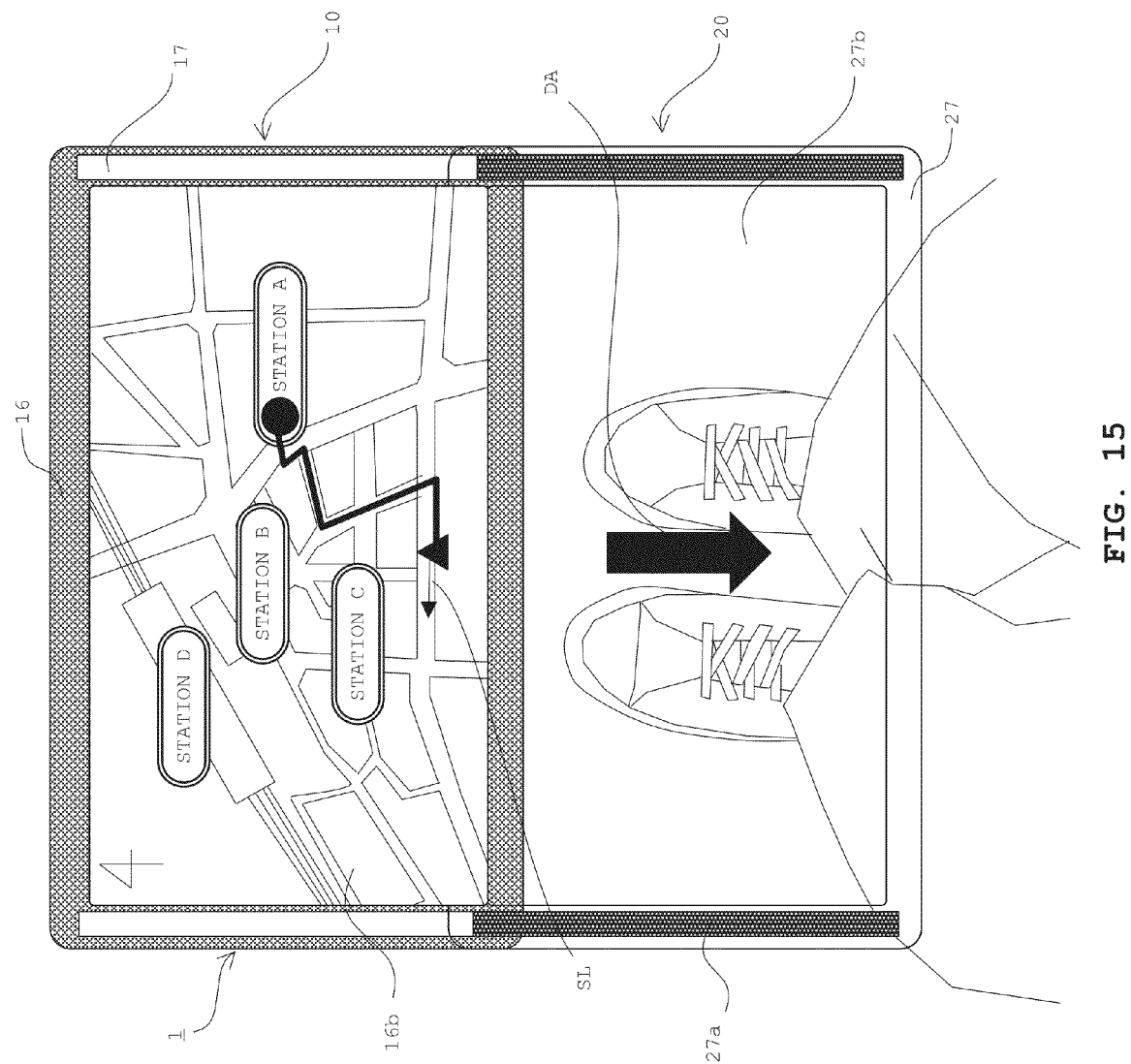
FIG. 15 is a diagram showing the state displaying the arrow showing the traveling direction according to the embodiment.

Also, according to the above embodiment, the present location mark ▲ showing the current position and the destination mark ● showing the destination position are displayed on the map of the second display surface 27b, in addition to these, as shown in FIG. 15, a route from a current position to a destination position can be displayed. In this case, map information includes image information of the map, coordinates corresponding information and road information. The CPU 100 refers to the road information and searches a road between the current position and the destination position. When a plurality of roads is searched, the CPU 100 calculates distances of each road, sets a road with the shortest distance as a route, and displays the route on the map. Also, if there are turns in the route, a direction connecting the current position and the first turn, which is the nearest turn from the current position, is a first direction to the destination position. For this reason, the CPU 100 obtains the traveling direction from the end part orientation and the first direction to the destination position, and displays an arrow DA of the traveling direction on the first display surface 16b. In FIG. 15, since the end part orientation and the direction to the destination position are the exact opposite, the arrow DA of the traveling direction, which is facing down, is displayed on the first display surface 16b. The user would know that the destination position is behind the user because of the direction of the arrow DA of the traveling direction. Then, the user advances along the arrow DA of the traveling direction and reaches the first turn, a direction connecting the first turn and the next turn as a next direction to the destination position, as the same with the above, the arrow DA of the traveling direction is displayed. By repeating the above process, the user is guided to the destination position.

Further, according to the above embodiment, a back surface orientation, an end part orientation and a direction to a destination position are displayed, however it is not necessary to display these orientations and direction.

Also, according to the above embodiment, when the current position and the destination position are matched, and then if the back surface of the first display module 13 is facing down, as the information showing the destination position on the first display surface 16b, a point mark PM and the point information were displayed. In contrast, even if the back surface of the first display 13 is not facing down, when the current position and the destination position were matched, the information showing the destination position can be displayed on the first display surface 16b.

The embodiment of the present invention may be modified variously and suitably within the display area of the technical idea described in claims.

REFERENCE SIGNS LIST

1 Portable terminal device
10 First unit
13 First display module
14 First input module
20 Second unit
24 Second input module
25 Second display module
100 CPU
101 Memory
104 Positioning module
105 Orientation sensor
106 Acceleration sensor

The invention claimed is:

1. A portable terminal device comprising:
   a display module made of a transparent material and comprising a display surface, the display module configured to set the display surface in a transparent state to allow scenery on one side of the display surface to be seen through another side of the display surface;
   a display control module configured to control the display module;
   a storage module configured to store a destination position;
   a position obtaining module configured to obtain a current position;
   a comparison module configured to compare the destination position and the current position;
   a tilt detecting module which detects a tilt of the display module;
   a determining module which determines whether a back surface of the display module is facing down or not based on an output of the tilt detecting module;
   a designation detecting module which detects when the display module is designated by the user; and
   a registration module which registers the destination position,
   wherein the position obtaining module obtains the current position when it is detected that the display module is designated, in a state in which a back surface of the display module is facing down, and
   wherein the registration module registers the current position, which the position obtaining module obtained, as the destination position, and
   wherein the display control module is configured to display information showing the destination position on the display module according to a comparison result of the comparison module, and set a display area other than the information showing the destination position in the display module to be in the transparent state.

2. The portable terminal device according to claim 1, further comprising:
   a direction obtaining module which obtains a direction from the current position to the destination position, wherein
   the display control module displays an image showing a direction to the destination position as the information showing the destination position on the display module based on the direction obtained by the direction obtaining module, and sets the display area other than information showing the destination position in the display module to be in the transparent state.

3. The portable terminal device according to claim 1, wherein
   the designation detecting module detects a position on the display module designated by the user, and
   the display control module displays the information showing the destination position at the position, which the designation detecting module detected, on the display module, and sets the display area other than information showing the destination position in the display module to be in the transparent state.

4. The portable terminal device according to claim 1, wherein the display control module displays the information showing the destination position on the display module and sets the display area other than the information showing the destination position in the display module to be in the transparent state when the current position obtained by the position obtaining module matches the destination position registered in the registration module in a state where a back surface of the display module is facing down.

5. The portable terminal device according to claim 1, comprising:
- a first unit; and
- a second unit capable of moving between a first position where the first unit overlaps the second unit and a second position where the second unit lies next to the first unit,
- wherein the display module has a first display module set to be in the transparent state and a second display module set to be not in the transparent state, where
- the first display module is set on the first unit; and
- the second display module is set on the second unit.

6. The portable terminal device according to claim 5, wherein the display control module
- displays the information showing the destination position on the first display module,
- sets the display area other than the information showing the destination position in the first display module to be in the transparent state, and
- displays map information on the second display module while the second unit is positioned in the second position.

* * * * *